(12) United States Patent
Huber

(10) Patent No.: US 7,401,657 B2
(45) Date of Patent: Jul. 22, 2008

(54) GROUND SCRAPER

(76) Inventor: Charles A. Huber, R.R. 1 P.O. Box 29, Brownell, KS (US) 67521

( * ) Notice: Subject to any disclaimer, the term of this patent is extended or adjusted under 35 U.S.C. 154(b) by 192 days.

(21) Appl. No.: 11/273,403

(22) Filed: Nov. 14, 2005

(65) Prior Publication Data

US 2006/0081385 A1 Apr. 20, 2006

(51) Int. Cl.
*A01B 63/10* (2006.01)
(52) U.S. Cl. .................... 172/395; 172/452; 172/684.5; 172/734; 172/764
(58) Field of Classification Search ................ 37/214, 37/234, 268, 270, 383, 407, 412, 414, 417, 37/435; 172/777, 799.5, 395, 452, 605, 684.5, 172/734, 764, 779
See application file for complete search history.

(56) References Cited

U.S. PATENT DOCUMENTS

| | | | |
|---|---|---|---|
| 1,388,809 A * | 8/1921 | Edginton ................ 172/799.5 |
| 3,409,120 A | 11/1968 | Van Huis | |
| 3,458,029 A | 7/1969 | Allen et al. | |
| 3,845,517 A | 11/1974 | Harris | |
| 3,912,016 A | 10/1975 | Arrnold | |
| 4,044,843 A | 8/1977 | Holub | |
| 4,189,009 A * | 2/1980 | Welch ..................... 172/799.5 |
| 4,383,380 A * | 5/1983 | Miskin ........................ 37/427 |
| 4,388,769 A * | 6/1983 | Miskin ........................ 37/428 |
| 4,389,800 A * | 6/1983 | Goby .......................... 37/415 |
| 4,711,403 A | 12/1987 | Gregory, Sr. et al. | |
| 5,143,160 A * | 9/1992 | May ............................ 172/311 |
| 5,297,745 A | 3/1994 | Vinyard | |
| 5,423,394 A | 6/1995 | Kendle | |
| 5,901,911 A | 5/1999 | Davis | |
| 6,041,528 A * | 3/2000 | Broach ........................ 37/431 |
| 6,098,320 A | 8/2000 | Wass | |
| 6,347,670 B1 * | 2/2002 | Miskin ........................ 172/199 |
| 6,442,921 B2 | 9/2002 | Feeley | |
| 6,446,298 B1 | 9/2002 | Berg, Jr. et al. | |
| 6,540,435 B1 * | 4/2003 | Lizarraga ..................... 404/98 |
| 7,063,166 B1 * | 6/2006 | Grosberg ..................... 172/200 |
| 7,117,953 B2 * | 10/2006 | Moyna ........................ 172/272 |
| 2002/0133899 A1 | 9/2002 | Van den Berg | |
| 2005/0150668 A1 * | 7/2005 | Williamson ................ 172/297 |

* cited by examiner

*Primary Examiner*—Gary S Hartmann
(74) *Attorney, Agent, or Firm*—Kenneth W. Iles

(57) ABSTRACT

A ground scraper designed to be pulled by a tractor or the like includes a pair of parallel frame rails with a scraper blade between them and perpendicular to them. The scraper blade can lowered to a preferred depth of scraping and can be raised above the bottom of the frame for towing. Dual-wheeled trucks on the rear of the frame can be raised off the ground to allow the frame to contact the ground for scraping and can be lowered into contact with the ground, also raising the frame off the ground, for towing on roads or the like. The rear of a tongue can be raised relative to the front of the tongue to pick up the front of the ground scraper frame for transporting the ground scraper and then the rear of the tongue can be lowered relative to the front of the tongue, allowing the frame to contact the ground. The exact angle of the tongue can float up and down in order to allow towing on uneven terrain.

8 Claims, 6 Drawing Sheets

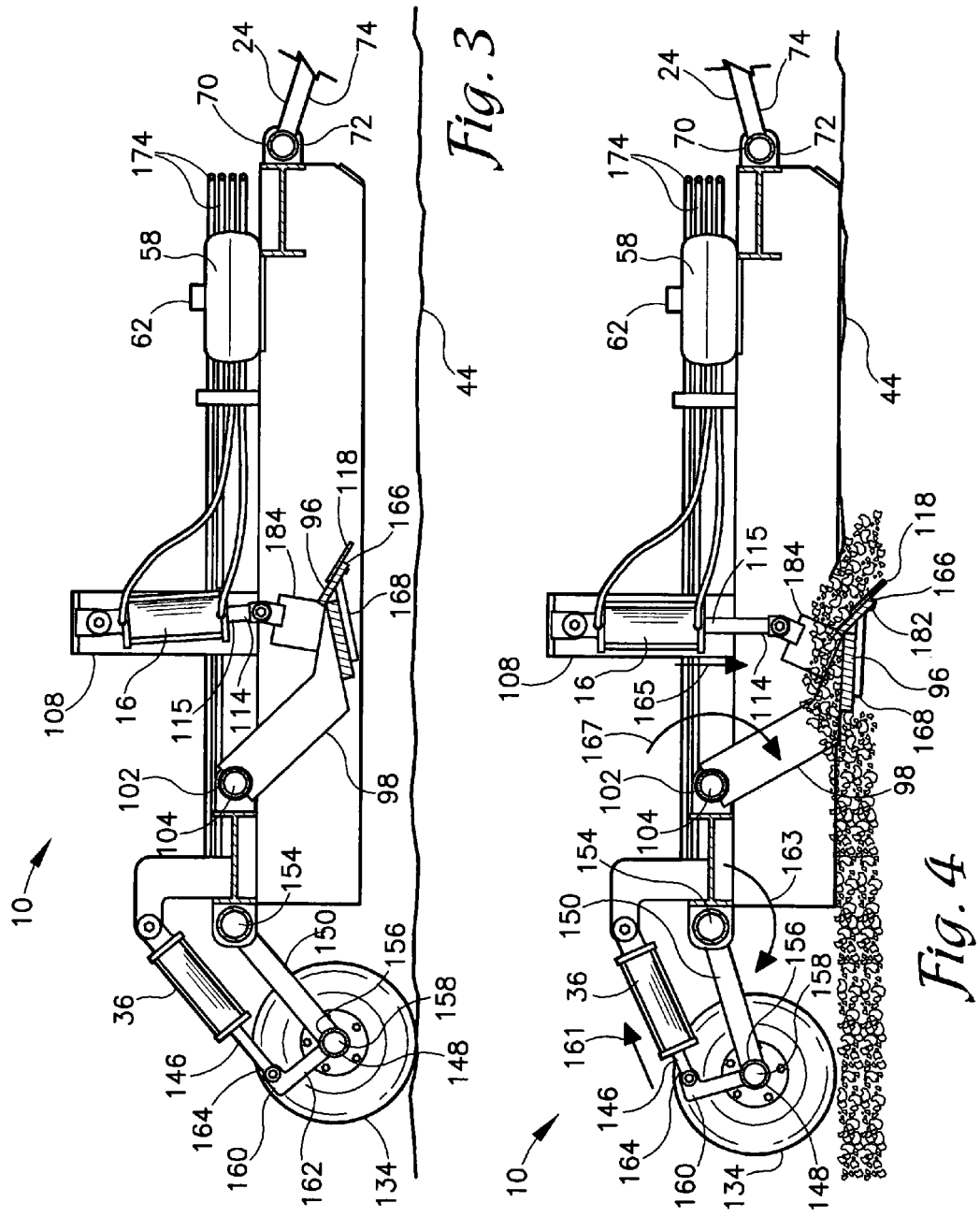

GROUND SCRAPER

CROSS-REFERENCE TO RELATED APPLICATIONS

Not Applicable.

STATEMENT REGARDING FEDERALLY SPONSORED RESEARCH OR DEVELOPMENT

Not applicable.

SEQUENCE LISTING

Not applicable

BACKGROUND OF THE INVENTION

The present invention is related to an apparatus for scrapping ground to remove an upper layer of material. More particularly, the present invention is designed and adapted for removing hardened manure from animal feed lots and the like.

DESCRIPTION OF THE RELATED ART INCLUDING INFORMATION DISCLOSED UNDER 37 C.F.R. 1.97 AND 1.98

Maintenance of feed lots, for example cattle fatting pens, is the largest expense of operating a feed lot. Removal of the accumulated manure is a very substantial portion of these expenses and present removal methods are slow and labor intensive. The present invention is designed to improve productivity of manure removal and the precision the depth of scraping needed to provide the best result in cleaning feed lots.

When livestock, such as cattle or hogs, is confined to feed lots or pens for fattening, large amounts of manure quickly accumulate. The accumulated manure becomes compacted as the animals walk on it. With this compression, drying and summer's intense sun, the manure hardens into a very solid dense material, which must be removed from time to time to maintain the elevation of the lot relative to fences and to reduce the opportunities for diseases to flourish. Because the manure hardens to a brick-like consistency in the hot sun, removing it is a difficult and expensive.

The upper layers of manure harden into a material called hardpan. Below the hardpan, the manure and the underlying ground tend to remain wet or moist and there disease bacteria live and thrive. The hardpan seals most bacteria into the underlying material and protects the animals from diseases. Removing all the manure exposes the underlying contaminated material and causes foot rot in animals and may expose them to other diseases. Therefore, in removing manure from animal feed lots it is economically important to remove only a relatively thin layer, ranging from 1 inch to 1 foot, of the hardpan, leaving an upper surface that is itself hardpan.

Because the hardpan has a brick-like consistency, it must be broken up before it can be removed. In one common technique, a conventional plow is pulled by a tractor to break up the hardpan. Then the loosened material is loaded into a truck bed by a front loader or the like for removal. This method, however, disrupts the lowest level of material that is plowed, that is, it does not leave an unbroken pan surface at the lowest point the plow blades strike, but rather creates an unsealed new surface, leading to a plowplan, that is a bowl in which the bottom surface is disrupted and porous and the sides are compacted soil or the like. Rain converts the plow pan into a lake and the broken-up bottom surface allows the free migration of disease bacteria to the surface, causing the animals to become ill. The same disease process occurs without rain, but perhaps less vigorously.

Therefore, it is important to leave an unbroken solid hardpan surface behind after removal of manure from feedlots. In order to accomplish this result, it is essential to control preciously the depth of the material that is removed. It is also crucial that the outer ends of any scraping blade be physically contained so that the outer ends of the scraping blade do not rip up ground adjacent to them, which would result in broken ground.

Some scrapers and the like have been patented, including for example U.S. Patent Application Publication 2002/0133899, disclosing an invention by Van den Berg that was published on Sep. 26, 2002, discloses an "Unmanned Vehicle Adapted to Be Used in a Stable, Such as a Cowshed" comprising a scraper on the end of a telescopic boom that extends rearwardly from a motorized vehicle and a second manure displacing device which is located under the vehicle chassis, which rides on wheels. In one embodiment, the downward force on the scraper can be adjusted by the cylinder 12, which applies downward force to the extension boom. This design does not provide boundary to the edges of the scraper blade, causing tearing of the ground at the outer edges of the scraper blade. The apparatus is also complex and expensive to manufacture and maintain.

U.S. Pat. No. 6,446,298, issued to Berg, Jr. et al. on Sep. 10, 2002, discloses a "Scraper for Animal Stalls" comprising a pair of scraper blades that have a number of depending curved plates welded to the back sides of the scraper blades mounted on a frame and pulled by the tow bar 15. When the scraper is pulled forward, the curved plates move such that the scraper blades fall into a vertical position where the lower edges of the scraper blades contact the ground and scrape it. The curved plated terminate in a thickened cylindrical disk-shaped end which serve as cam followers along the ground. This results is a cutting depth that changes in response to different densities of the manure, in contrast to the more desired practice of removing a certain specific thickness of manure.

U.S. Pat. No. 6,442,921, issued to Feeley on Sep. 3, 2002, discloses a "Method of Raking with a Tractor Having a Rear Hydraulic Blade" comprising a blade, resembling a small snow plow or scraper having a concave side profile and a flat straight bottom edge. The rake fitting is an elongated channel member that is fastened to the bottom the snow plow blade and which includes a plurality of downwardly protecting teeth or tines, which serve as rake tines when the device is pulled while resting on the ground. Any type of scraping carried out with this device would result in a broken lower scraped surface, allowing bacteria in the soil to reach feedlot animals.

U.S. Pat. No. 6,098,320, issued to Wass on Aug. 8, 2000, discloses a "Front End Loader Attachment Including Forks and Grapple for Digging, Dislodging and Lifting Materials" comprising a grapple having a lower jaw or fork with pointed lower ends and pivoting upper jaw that can be opened or closed against the lower jaw by a hydraulic ram. The jaws and can be used to pick up, move and release objects and could be used to break up soil or the like, but would leave a broken lower surface.

U.S. Pat. No. 5,901,911, issued to Davis on May 11, 1999, discloses an "Apparatus and Method for Removing Caked Litter from a Poultry Facility" comprising a sifting apparatus attached to a small tractor or the like. The sifting apparatus picks up litter from the floor of a chicken coop and sifts out the clean litter, returning it to the floor, while retaining the soiled litter for use as fertilizer. A number of arms mounted on an axle rotate in the fashion of a boat's paddle-wheel and the ends contact the ground to break up and sweep up the litter for sifting and delivering the caked litter to a conveyor belt, which carries it up and deposits it into a bin. This device cannot break up hardpan or leave an unbroken surface after scraping.

U.S. Pat. No. 5,423,394, issued to Kendle on Jun. 13, 1995, discloses a "Three Point Hitch for Hummer Truck and Other Vehicles" comprising a base plate that presses against the bumper of the motor vehicle and is fastened thereto to provide a hitch that supports a boom, which can be raised or lowered by a hydraulic ram and may carry a blade for scrapping gravel, snow, ice, dirt, manure and the like from the ground or a floor (column 4, lines 7-12). Such a blade is not described further and is not illustrated. In any event there is no disclosure or suggestion that any scraping could be carried out to a particular desired depth.

U.S. Pat. No. 5,297,745, issued to Vinyard on Mar. 29, 1994, discloses a "Rear-Mounted Manure Gathering Machine and Method of Handling Manure" comprising a frame carried above the ground by wheels that can be raised or lowered by a hydraulic ram, pushing against an arm attached to a pivot point, which causes a link to the wheel to move up or down. When the wheels are raised, they do not contact the ground and the frame does. A yoke at the front of the machine is connected to a draw bar of a tractor or the like. Mounted on top of the frame is a large tank and a pickup mechanism that includes a vertically oriented set of stacked rotating vanes attached to the rear of the machine. At the bottom of the housing for the pickup mechanism is a scraper blade which contacts the ground during scraping and scrapes material into a bin, that is, a housing enclosure where augers sweep up the loosened material into the center of the width of the frame. The manure is mixed with water in an onboard tank the resulting slurry is sprayed from the tank. The scraper blade is at the very rear of the apparatus, where control of the weight on the blade is lacking and hence it is not well suited for cutting to a specific depth.

U.S. Pat. No. 4,711,403, issued to Gregory, Sr. et al. on Dec. 8, 1987, discloses a "Method and Apparatus for Cleaning Chicken Manure from Chicken Houses" comprising a motorized vehicle that carries a scraper blade that scraps up chicken litter and manure and coveys to a classifier shaker that separates the chicken litter from the manure and shakes the litter back onto the floor for reuse. This apparatus is designed to scrap material down to a hard floor and is not adapted for digging into the ground.

U.S. Pat. No. 4,044,843, issued to Holub on Aug. 30, 1977, discloses a "Tractor-Mounted Scraper" comprising a scraper blade that is attached to the front of a convention shovel bucket such as those commonly used on front-loaders, bulldozers and the like, which is attached to a tractor. A hydraulic ram can change the angle of the scraper and a second hydraulic ram can be used to press downwardly on the frame of the scraper sufficiently to pick up the rear wheels of the tractor, thereby applying more weight to the scraper. This device does not provide controlled cutting away of a specific depth of material.

U.S. Pat. No. 3,912,016, issued to Arnold on Oct. 14, 1975, discloses a "Hydraulically Powered Root and Soil Separating and Windrowing Apparatus" comprising spaced parallel side members that hold a plurality of rotating vanes, which are like plow disks. A scraper blade is attached at the front of the apparatus and digs into the ground. The angle of the scraper blade can be changed by adjusting the length of a control cable. This device does not provide for control of the depth of cutting or contain the ends of the blade.

U.S. Pat. No. 3,845,517, issued to Harris on Nov. 5, 1974, discloses a "Scraper Attachment" comprising a pair of elongated scraper blades attached to a tractor for being pulled by the tractor. The blades fold up vertically behind the tractor for transport. The device is designed for, scraping manure, for example, but cannot control the depth of the cut. An alternative embodiment includes solid plates whose bottom edges cut into the ground. This embodiment is basically like a snow plow that is pulled instead of pushed and which suffers from the same shortcoming as the preferred embodiment.

U.S. Pat. No. 3,458,029, issued to Allen et al. on Jul. 29, 1969, discloses a "Pit Cleaner for Animal Houses" comprising a scraper blade with flexible extensions to permit the scraper blade to be used with varying widths of scraping paths. This scraper cannot be used to cut into the ground or to cut to a specified depth.

U.S. Pat. No. 3,409,120, issued to Van Huis on Nov. 5, 1968, discloses a "Manure Scraper" comprising a scraper blade, which is held by a pair of abbreviated frame members, which are attached to a pair of cables for pulling the device using a tractor or the like. This device cannot be operated to cut into the f ground by a specified amount.

Thus there is a need for a ground scraper that can scrape ground, manure or the like to a specified depth; that leaves behind an unbroken surface; and that breaks up the scraped material into pieces that can be readily handled with other equipment; that contains the two ends of the scraper blade to prevent the two ends from breaking up adjacent ground, preserving the unbroken resulting surface adjacent to the ground scraper as well as along length of the scraper blade, rather than leaving a broken finished surface that would encourage disease in feedlot animals; and that can be travel over conventional roads in a non-scraping mode and then lowered into a scraping mode at the job site.

BRIEF SUMMARY OF THE INVENTION

Accordingly, it is a primary object of the present invention to provide a ground scraper that can scrape ground, manure or the like to a specified depth.

It is another object of the present invention to provide a ground scraper that leaves behind an unbroken surface and that breaks up the scraped material into pieces that can be readily handled with other equipment.

It is another object of the present invention to provide a ground scraper that contains the two ends of the scraper blade to prevent the two ends from breaking up adjacent ground, preserving the unbroken resulting surface adjacent to the ground scraper as well as along length of the scraper blade, rather than leaving a broken finished surface that would encourage disease in feedlot animals.

It is another object of the present invention to provide a ground scraper that can be travel over conventional roads in a non-scraping mode and then lowered into a scraping mode at the job site.

These and other objects of the present invention are achieved by providing a frame having a pair of C-channel side members extending from the front of the ground scraper to its rear, with these members connected by front and rear cross members to form a box frame, with a transversely mounted scraper blade in approximately the middle of the box frame. In use, the side rail members, but not the front or rear frame members, ride hard on the ground, held in firm contract with the ground by a number of large weights mounted on the frame, and a pair of vertically mounted double-acting hydraulic rams, with one connected to each end of the scraper blade. These rams can force the blade into the ground. The ground scraper is attached to an articulated tongue that is fastened to a tractor, which pulls it.

A rear carriage wheels truck can be raised to drop the frame onto the ground, or lowered to lift the frame off the ground, allowing the ground scraper to be pulled without scraping, thereby permitting it to be pulled along conventional streets or over fields until the job site is reached. The rear carriage wheels truck is raised or lowered by dedicated double-acting hydraulic rams.

The tractor's hydraulic power system is used to actuate and to control the double-acting hydraulic rams on the ground scraper.

The ground scraper according to the present invention is designed to automate the process of removing such manure from feedlots and pens. The ground scraper is a scraper, which cuts or scraps a layer of ground or the like, such as manure from the feedlot substrate, with a layer of manure being forced up and over the top of scraper blade, which breaks the scraped layer in to pieces, where it then lies lose on the ground. In this condition, the manure can readily be removed by other equipment, such as a snow plough-type blade, a front loader or the like, which deposits the manure into a truck bed or the like for removal and disposal or for further use.

Other objects and advantages of the present invention will become apparent from the following description taken in connection with the accompanying drawings, wherein is set forth by way of illustration and example, the preferred embodiment of the present invention and the best mode currently known to the inventor for carrying out his invention.

BRIEF DESCRIPTION OF THE SEVERAL VIEWS OF THE DRAWING

FIG. 3 is a cross sectional left-hand side view of the ground scraper of FIG. 1 shown with the carriage wheels deployed downward for pulling the ground scraper without scraping taken along lines 3-3 of FIG. 2 and the outside wheel removed for clarity.

FIG. 4 is a cross sectional left-hand side view of the ground scraper of FIG. 1 shown with the carriage wheels deployed upward for pulling the ground scraper to scrap the ground taken along the lines 4-4 of FIG. 2 and the outside wheel removed for clarity.

DETAILED DESCRIPTION OF THE INVENTION

Figure 1:
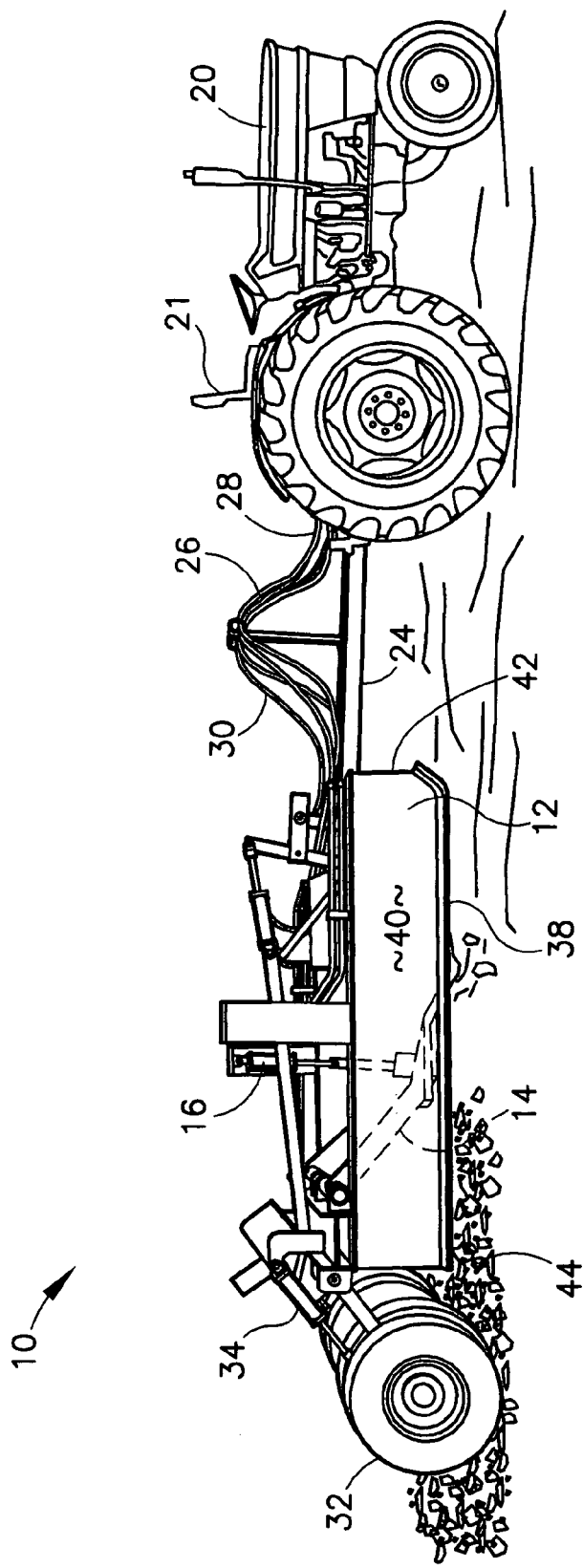
FIG. 1 is a side view of a ground scraper according to the present invention shown attached to a farm tractor.
Figure 2:
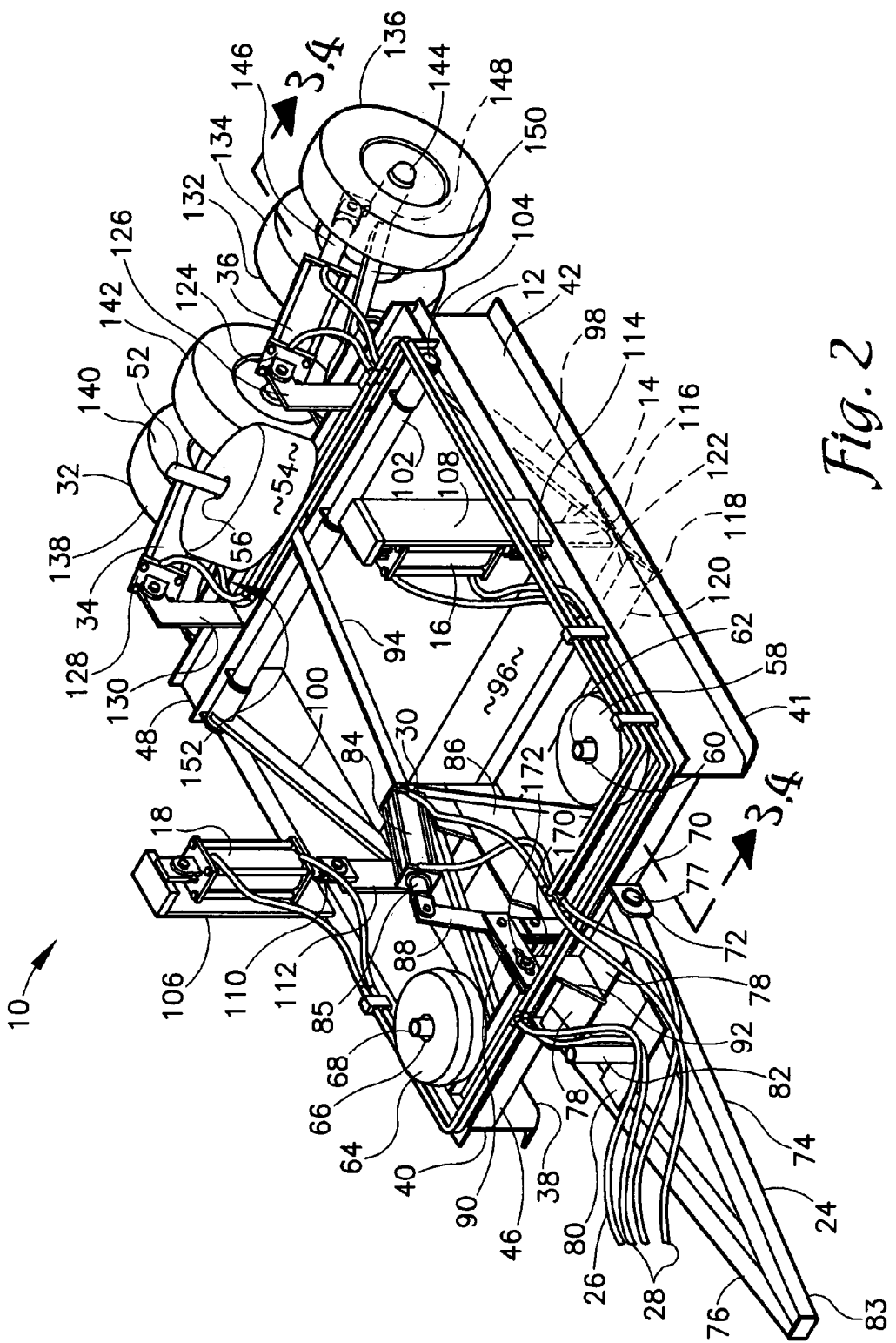
FIG. 2 is a left front isometric view of the ground scraper of FIG. 1.

Referring to FIG. 1, the ground scraper 10 includes a box frame 12 that houses a scraper blade assembly 14 that can be lowered into a ground scraping position and raised to clear the ground or to scrape to selected depths by the double-acting scraper left-side hydraulic ram 16 and the double-acting scraper blade right-hand hydraulic ram 18 (FIG. 2). As the ground scraper 10 is pulled along the ground by the tractor 20 with the ground scraper 10 in the lowered position and the scraper blade assembly 14 in a lowered position, the ground scraper 10 scrapes the top layer of ground or other material to the desired depth, breaking the scraped layer into principally large pieces that can be scooped up by front loaders or the like (not shown) and loaded into a dump truck of the like (not shown) for further handling. Right-side, right, left-hand, left and so forth are defined from the point of view of a driver sitting in the driver's seat 21 of the tractor 20. Front is the end of the ground scraper 10 closer to the tractor 20 when the ground scraper 10 is attached to the tractor 20 as shown in FIG. 1 and rear is the portion of the ground scraper 10 that is farthest from the tractor 20 when the ground scraper 10 is attached to the tractor 20 as shown in FIG. 1.

Still referring to FIG. 1, the box frame 12 includes a front end 22 with a tongue 24 attached to the front end 22 of the box frame 12. In use the tongue 24 is connected to the tractor 20 or the like so that the tractor 20 can pull the ground scraper 10 using a conventional and appropriate hitch assembly. Hydraulic lines 26 are connected to the hydraulic power system of the tractor at their distal ends 28 and at their proximal ends 30 to various hydraulic control cylinders to raise and lower the carriage truck wheel assembly 32 and the scraping blade assembly 14, described below. The carriage truck wheel assembly 32 is raised and lowered by the double-acting carriage truck assembly right-side hydraulic ram 34 and the double-acting carriage truck assembly left-side hydraulic ram 36 (FIG. 2). When the carriage truck wheel assembly 32 is extended downward, as shown in FIG. 1, and the front end 22 of the box frame 12 is raised as described in connection with FIG. 2 below, the bottom edge 38 of right-hand side frame rail 40 and the corresponding bottom edge 41 of the left-hand side frame rail 42 (FIG. 2) are elevated above the ground 44 so that no scraping can be performed and the ground scraper 10 can be towed on roads or over fields to the job site, where the scraper blade assembly 15 is lowered into the scraping position at the desired depth into the soil.

Referring to FIG. 2, the box frame 12 is formed from the spaced parallel side frame rails 40, 42, which are steel C-channel beams, that run from the front to the rear of the ground scraper 10, and which are connected by the transverse front frame member 46, which has an upper surface even with the upper surfaces of the side frame rails 40, 42, but which is narrower so that it does not touch the ground and the rear transverse brace 48 fixed the top of the side frame rails 40, 42 perpendicular to them, preferably by welding, to complete the box frame 12. Importantly, during scraping, no part of the front or rear of the box frame 12 contacts the ground, which is broken up into pieces by the scraper blade 118 and scraper 96. A transverse wheel carriage member 50 (best seen in FIG. 5) holds the truck assemblies 132, 138 of the carriage truck wheel assembly 32.

Still referring to FIG. 2, three substantial weights are mounted on the box frame to ensure forceful contract of the side frame rails 40, 42 when the ground scraper is deployed in the scraping mode. An upstanding rear weight-retaining pin 52 is fixed to the box frame 12 in the middle of the rear transverse frame member 50 and a cylindrical rear weight 54 having an central aperture 56 through it is mounted on the pin 52. The rear weight 54 weighs preferably about 680 kg (1,500 lbs)-910 kg (2,000 lbs). A left front weight 58 having a central aperture 60 is similarly mounted on the upstanding left front mounting pin 62, which is welded to the box frame 12 and a right front weight 64 having a central aperture 66 is mounted onto the upstanding right front mounting pin 68, which is welded to the box frame 12. The left front weight 58 and the right front weight 64 are also preferably essentially cylindrical and the preferred weight of each normally falls within the range of about 230 kg. (500 lbs)-385 kg. (850 lbs). The amount of all the weights can be adjusted as needed to achieve a specific depth of cut. In each case, the weight must be sufficient to maintain contact between the lower edges of the side frame rails 40, 42 and the ground at all times during scraping.

Still referring to FIG. 2, the tongue 24 is mounted onto a tongue bracket 70 having a pair of mounting ears 72, which is fastened to the front transverse frame member 46. The tongue 24 includes a left tongue member 74 and a right tongue member 76 joined at their font ends and spaced apart to accommodate a rectangular tongue plate 78, with the two tongue members 74, forming a triangle, whose base is pivotally fastened to the tongue bracket 70 at the ears 72, where the tongue plate 78 is fastened between the left tongue member 74 and the right tongue member 76 by the pin 77. Intermediate of the tongue's 24 ends is fastened a reinforcing plate 80, having an upstanding pin 82 fastened to it for receiving and retaining another weight similar to the weights 54, 58, 64, if needed.

Still referring to FIG. 2, the distal end 83 of the tongue 24 can be pivoted up and down about the pin 77, which is adjacent to, parallel to and in front of the transverse front frame member 46 for towing and to facilitate continuous contact between the ground 44 and the side frame rails 40, 42 during scraping and to prevent such contact when the ground scraper 10 is in its transport mode by operation of the double-acting tongue hydraulic ram 84. The hydraulic ram 84 is mounted on a vertical portion of the tongue hydraulic ram mounting plate 86, which is fastened to the box frame 12. The piston rod 85 of the tongue hydraulic ram 84 moves the upper end of the vertical pivot arm 88, which has a lower end pivotally connected to the front end of the tongue hydraulic ram mounting plate 86, back and forth as controlled by the operator of the ground scraper 10. A horizontal tongue control arm 90 is pivotally connected to an upstanding gusset 92 fastened to the tongue plate 78 at its distal end and is pivotally mounted between the upper and lower ends of the vertical pivot arm 88 at its proximal end. A long reenforcing rod 94 has one end fastened to the tongue hydraulic pate 86 at one end and to the rear transverse brace 48 at its other end to brace the double-acting hydraulic ram 84. When the piston rod 85 of the hydraulic ram 84 is extended, the distal end of the tongue 24 is pushed downward and when the piston rod 85 is retracted, the distal end of the tongue 24 is raised.

Still referring to FIG. 2, a scraper 96 runs across the box frame 12 between the right-hand side frame rail 40 and the left-hand side frame rail 42 about half-way between the transverse front frame member 46 and the rear transverse frame member 50. The scraper 96 is fixed to the lower end of a left-hand scraper arm 98 on its left-hand end and to the lower end of a right-hand scraper arm 100 on its right-hand end. The upper ends of the left-hand scraper arm 98 and the right-hand scraper arm 100 are fastened to a sleeve 102 mounted over a stationary axle 104, allowing the scraper to be moved up and down. The up and down movement is controlled by operation of the double-acting scraper left-side hydraulic ram 16, which is vertically mounted on the bracket 106 and the double-acting scraper right-side hydraulic ram 18, which is vertically mounted on the bracket 108. A distal end 110 of the piston rod 111 of the right-side double-acting hydraulic ram 18 is pivotally connected to the top end of a right-hand vertical force transfer plate 112, whose lower end is fixed to the right-hand side of the scraper 96. A distal end 114 of the piston rod 115 of the left-side double-acting hydraulic ram 16 is pivotally connected to the top end of a left-hand vertical force transfer plate 116, whose lower end is fixed to the left-hand side of the scraper 96. The two double-acting hydraulic rams 16, 18 operate in concert, with each piston rod moving up or down by the same distance and with the same force. In use the rams 16, 18 are preferably 60,000 lbs rams.

Still referring to FIG. 2, a scraper blade 118 is bolted to the lower edge of the scraper 96 and can be removed and sharpened or replaced. The scraper blade 118 is preferably about 2.5 m (8 feet) long, 25 cm (10 inches) wide and 1.3 cm (0.5 inches) thick. The scraper blade 118 can be pushed into the soil by any desired amount from 0 to about 20.5 cm (8 inches) and bites into the soil at an angle between about 15°-30° with the preferred angle being about 22° (the angle of attack), that its, with the lower edge 120 of the scraper blade 118 being closer to the front end 22 of the box frame 12 that the top edge 122 of the scraper blade 118. The scraper is held in a desired position by the rams 16, 18. As the scraper 116 is pushed into the soil, the angle of attack of the scraper blade 118 changes somewhat due to the pivoting motion of the scraper 96 about the axis of rotation defined by the arms 98, 100, but such changes in the attack angle are insignificant so long as the scraper blade 96 remains within the stated range.

Still referring to FIG. 2, left-side hydraulic ram 36 is pivotally connected at it upper end 124 to the vertical mounting bracket 126, whose lower end is fixed to the rear transverse brace 48 and the right-hand hydraulic ram 32 is pivotally connected at its upper end 128 to the vertical mounting bracket 130, whose lower end is fixed to the rear transverse brace 48. The mounting brackets 126, 130 provide the necessary resistance for the rams 34, 36 to work against. The rams 34, 36 operate in concert, with the piston rods both being extended or retracted by the same distances and at the same rates.

Still referring to FIG. 2, the carriage truck wheel assembly 32 includes a left-hand truck 132 having a pair of wheels and tires 134, 136 and a right-hand truck 138 having a pair of wheels and tires 140, 142 all mounted on a live axle 144. The distal end of the piston rod 146 of the ram 36 is pivotally connected to the axle housing 148 and the right-side ram 34 is identically connected to the axle housing 148. A left-hand swing arm 150 is pivotally connected to the rear transverse brace at one end and to the axle housing 148 at its other end. A right-hand swing arm 152 is identically connected adjacent to the right-hand side of the box frame 12.

Referring to FIG. 3, as shown, the box frame 12 and the scraper blade 118 are lifted off the ground 44 for pulling the ground scraper 10 along the roads or to a job site. The piston rod 146 of the double-acting carriage truck assembly left-side hydraulic ram 36 is shown fully extended, as is the piston rod of the ram 34, which lifts the box frame 12 off the ground 42. The left-side swing arm 150 is pivotally connected to the rear transverse brace 48 at the pivot housing 154. The lower end 156 of the left-side swing arm 150 is fixed to the left-hand truck 132 at the sleeve 158, which is fixed to the axle housing 148 between the wheels 134, 136. The top end 160 of the right-angle bracket 162 is pivotally connected to the lower end 164 of the piston rod 146 of the ram 36, while the lower end 166 of the right angle bracket 162 is fixed to the axle housing 148 and the lower end 168 of the left side swing arm 156.

Still referring to FIG. 3, in the over the road transport mode shown in FIG. 3, the scraper 96 and attached scraper blade 118 are retracted well above the ground 44 and above the lower edge of the box frame 12 by fully retracting the piston rods on the double-action scraper blade left-side hydraulic ram 16 and the double-acting scraper blade right-side hydraulic ram 18.

Still referring to FIG. 3, the distal end 83 of the tongue 24 is lowered by extending the piston rod 85 on the double-acting hydraulic ram 84. When the distal end 83 of the tongue 24 is connected to a fixed height hitch, as shown in FIG. 1, the front of the box frame 12 is raised up off the ground 44 into a transport position. When the scraper 96 and front of the box frame 12 are thus raised and the carriage truck wheel assembly 32 is lowered, thrusting the rear of the box frame 12 upward, the ground scraper is ready for transport as a trailer and can be legally and safely driven on the roads or over fields or the like to the specific job site when ground needs to be scraped. This eliminates the need for a separate trailer for transporting the ground scraper 10 to a job site.

Still referring to FIG. 3, the scraper 96 is formed from a scraper face 166 set at a downward angle with its front edge in front of its top edge and a brace member 168 fixed to it along its entire length by welding or the like at an angle of about 135° to the scraper face 166, with a seven reenforcing gussets 168 secured by welding to both the scraper face and the brace member 168. The scraper blade 118 is fastened adjacent to the lower edge of the scraper face 166. This construction is shown in more detail in FIG. 8. Other constructions, such as a one-piece scraper are also desirable.

Referring to FIG. 4, each of the above three steps has been reversed, making the ground scraper ready for scraping. The rear wheels 132, 136, 140, 142 are raised out of contact with the ground 40 by fully retracting the piston rods in the rams 34, 36, as indicated by the arrow 161, causing the counter-clockwise pivoting action indicated by he arrow 163. The scraper blade 118 is forced into the ground to the desired depth by extending the piston rods on the rams 16, 18, causing the downward motion shown by the downward arrow 165 and the counterclockwise pivoting action of the arms as indicated by the pivot arrow 167. Finally, the distal end 83 of the tongue 24 is pivoted upward by retracting the piston 85 of the ram 84, allowing the front edges of the side rails frame members 40, 42 of the box frame 12 to be held against the ground 44 by the weights 54, 64, 58, while the tongue 24 can ride up and down as needed in uneven terrain. This floating movement is accomplished by allowing the connecting bolt 170 in the upstanding gusset 92 to reciprocate in the slot 172 in the horizontal tongue control arm 90 (FIGS. 2, 8), as explained in greater detail in connection with FIG. 8 below. In the use position, bottom edge 38 of the right-hand side frame rail 40 and the bottom edge 41 of the left-hand side frame rail 42 both contact the ground 40 throughout their lengths (unless a rough surface causes one or the other to ride on a high spot, which will soon be eliminated) and the scraper 96 is lowered into the ground 44 to the desired depth. Hydraulic fluid carrying metal pipes 174 carry hydraulic fluid and pressure to the various rams throughout the ground scraper 10 and are connected to the flexible hydraulic lines 26. All lines may be flexible if desired, but utilizing the metal pipes 174 is more cost effective and more durable. Specific designs of the hydraulic circuits for the ground scraper 10 are considered to be within the ordinary skill in the art.

Figure 5:
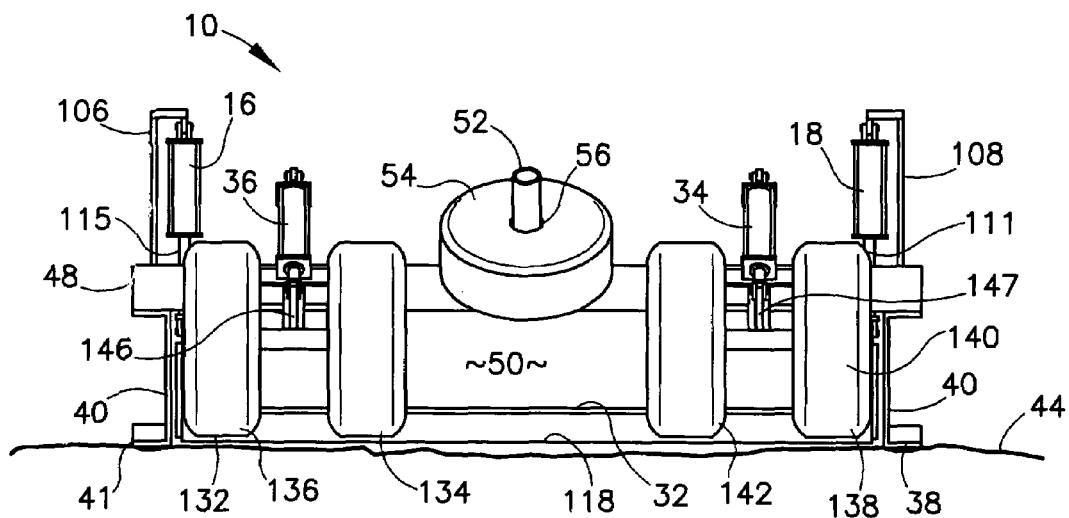
FIG. 5 is a rear view of the ground scraper of FIG. 1 shown with the carriage wheels deployed upward, allowing the ground scraper to be pulled along the ground and scrap the ground.

Referring to FIG. 5, the ground scraper 10 is shown in use, with the bottom edge 41 of the left-hand side frame rail 40 and the bottom edge 38 of the right-hand side frame rail 40 contacting the ground 44 and the scraper blade 118 is lowered into its ground scraping position, while the carriage truck wheel assembly 32 is raised up so that the wheels 134, 136, 140, 142 do not contact the ground 44. Also visible in FIG. 5 is the piston rod 147 of the double-acting carriage truck assembly right-side hydraulic ram 34.

Figure 6:
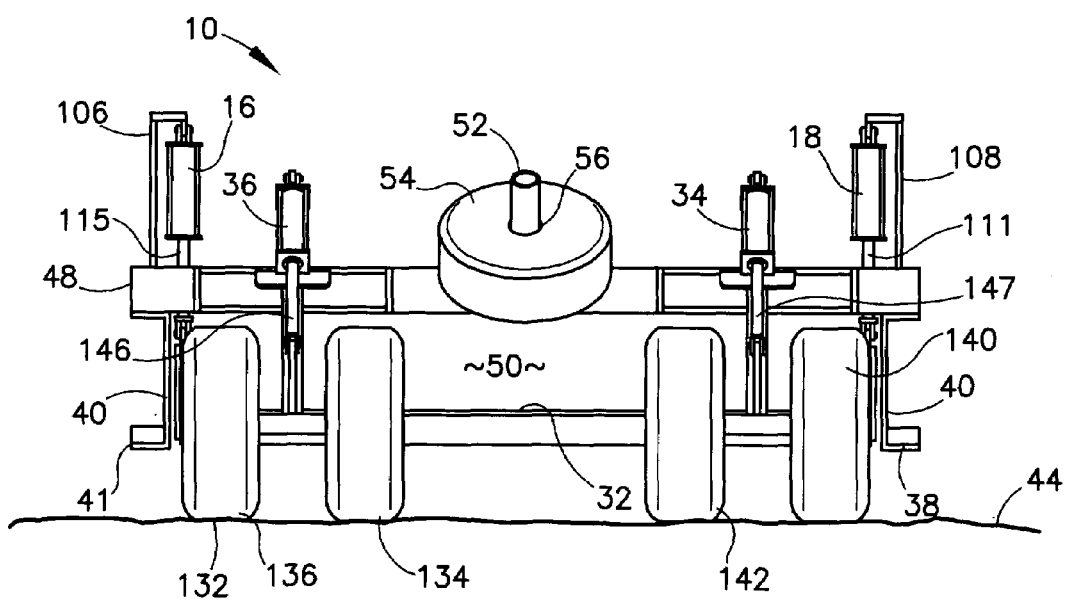
FIG. 6 is a rear view of the ground scraper of FIG. 1 shown with the carriage wheels deployed downward, allowing the ground scraper to be pulled along the ground without scraping the ground.

Referring to FIG. 6, the ground scraper 10 is shown in its transport position, i.e., non-scraping position, with the bottom edge 41 of the left-hand side frame rail 40 and the bottom edge 38 of the right-hand side frame rail 40 well above the ground 44 and the scraper blade 118 raised into its non-scraping position above the bottom edge 41 of the left-hand side frame rail 40 and the bottom edge 38 of the right-hand side frame rail 40, while the carriage truck wheel assembly 32 is in its lowered position with the wheels 134, 136, 140, 142 in contact with the ground 44 so that the ground scraper can be towed over roads or fields to the job site.

Figure 7:
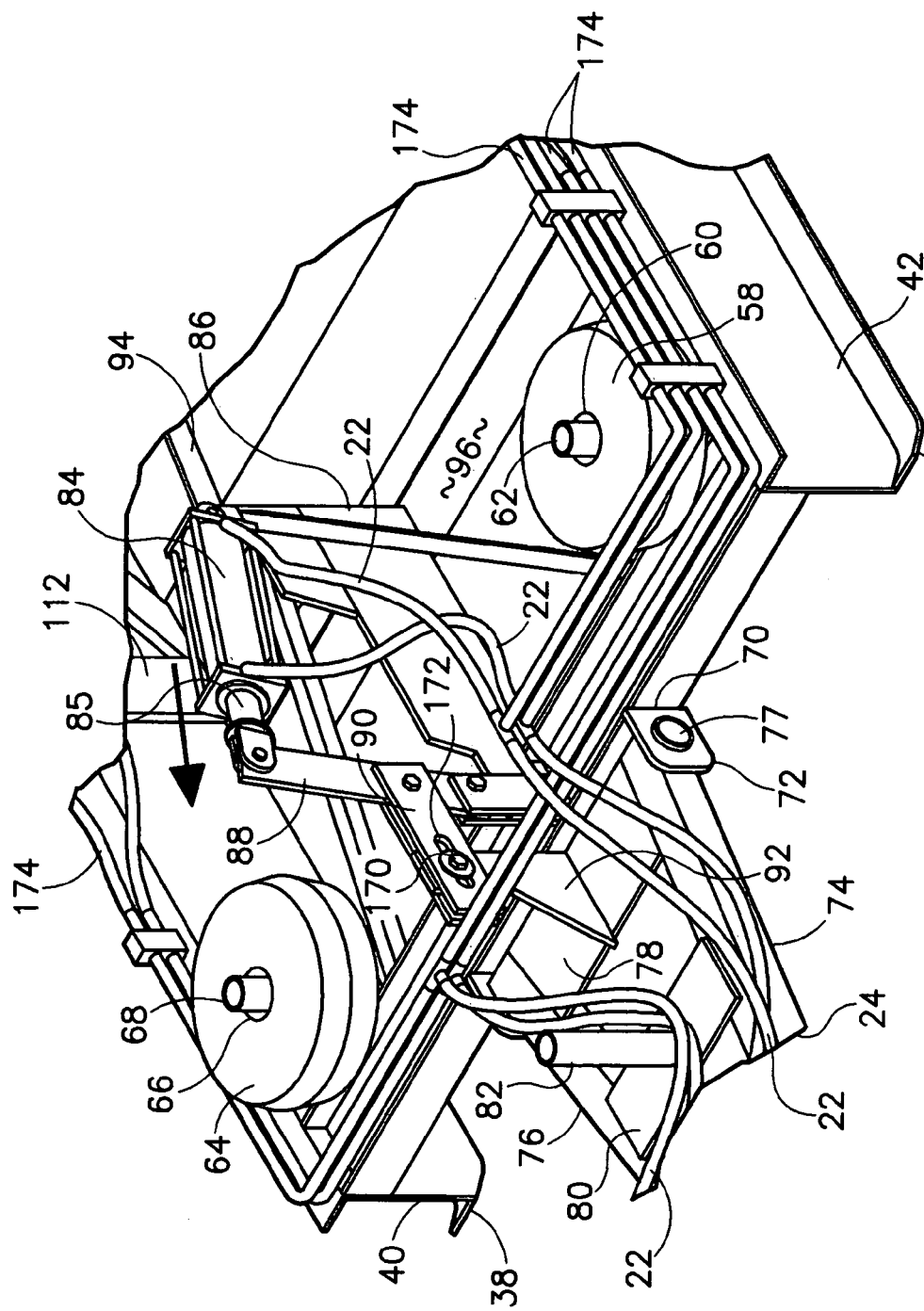
FIG. 7 is an enlarged fragmentary left front isometric view as shown in FIG. 2 with enlarged parts for clarity.

Referring to FIG. 7, when the piston rod of the ram is extended along the direction of the arrow 180, the tongue 24 is raised, moving the tongue into the non-scraping towing position. When the piston rod is retracted by moving it in the direction opposite of the arrow 180, the tongue is lowered, allowing the bottom edge 41 of the left-hand side frame rail 40 and the bottom edge 38 of the right-hand side frame rail 40 to contact the ground 44, placing the ground scraper 10 into its scraping position, while the tongue can continue to move up and down in response to changes in the terrain, by due to the slot 172, as discussed above.

Figure 8:
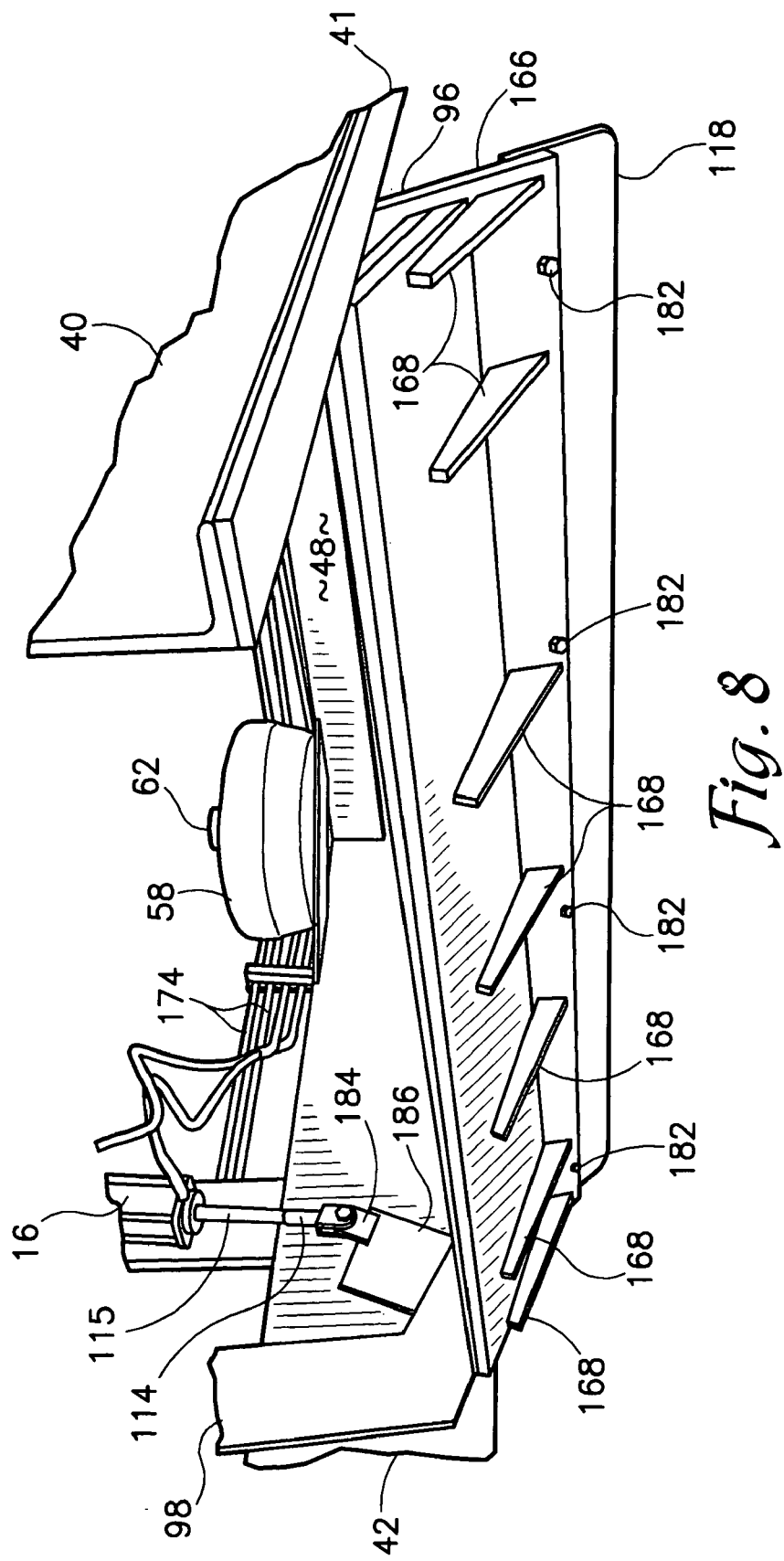
FIG. 8 is an enlarged fragmentary isometric view of the scraper blade assembly of the ground scraper of FIG. 1 shown from the rear of the scraper blade assembly.

Referring to FIG. 8, the scraper blade 118 is fastened to the scraper face 166 by the bolts and corresponding nuts 182. The distal end 114 of the piston rod 115 is pivotally connected to a bracket 182, which is in turned connected to an ear 184 that is connected to the left-hand scraper arm 98. The distal end 110 of piston rod of the right side ram 18 is identically connected to the right-hand scraper arm 100.

While the present invention has been described in accordance with the preferred embodiments thereof, the description is for illustration only and should not be construed as limiting the scope of the invention. Various changes and modifications may be made by those skilled in the art without departing from the spirit and scope of the invention as defined by the following claims.

I claim:

1. A ground scraper comprising:
   a. a pair of parallel frame rails, said frame rails further comprising a left-hand side frame rail and a right-hand side frame rail;
   b. means for maintaining said parallel relationship of said pair of frame rails, said means for maintaining said parallel relationship of said pair of frame rails further comprising a transverse front frame member fixed to a front end of each of said pair of parallel frame members and a rear transverse brace fixed to a back end of each of said parallel frame rails with said pair of frame rails and said transverse front frame member and said rear transverse brace forming a box frame;
   c. a scraper connected to said frame rails lying between said frame rails, wherein said scraper further comprises a scraper blade attached to said ground scraper and a double-acting scraper blade left-side hydraulic ram connected at one end to said scraper blade and at another end to said left-hand side frame rail and a double-acting scraper blade right-side hydraulic ram connected at one end to said scraper blade and at a second end to side right-hand side frame rail, whereby extending said double-acting scraper blade left-side hydraulic ram and said double-acting scraper blade right-side hydraulic ram drives said scraper blade deeper into the ground and retracting said double-acting scraper blade left-side hydraulic ram and said double-acting scraper blade right-side hydraulic ram draws said scraper blade to a shallower depth in the ground d. means for raising or lowering said scraper;

e. means for raising or lowering said frame rails; and f. means for increasing or decreasing the weight loaded onto said ground scraper.

2. A ground scraper in accordance with claim 1 wherein said scraper spans the width between said pair of parallel frame rails and said scraper is mounted on and supported by a left-hand scraper arm pivotally connected at its upper end to said left-hand side frame rail and a right-hand scraper arm pivotally connected at its upper end to said right-hand side frame rail.

3. A ground scraper in accordance with claim 1 wherein said means for raising and lowering said frame rails into a ground-contacting use position further comprises at least one hydraulic ram having one end connected to a top end of a right-angle bracket pivotally connected to a sleeve on an axle of a truck connected to a said rear transverse brace and said at least on hydraulic ram having its other end connected to said rear transverse brace.

4. A ground scraper comprising:

a. a pair of parallel frame rails, said frame rails further comprising a left-hand side frame rail and a right-hand side frame rail;

b. means for maintaining said parallel relationship of said pair of parallel frame rails, said means for maintaining said parallel relationship of said pair of frame rails further comprising a transverse front frame member fixed to a front end of each of said pair of parallel frame members and a rear transverse brace fixed to a back end of each of said parallel frame rails with said pair of frame rails and said transverse front frame member and said rear transverse brace forming a box frame;

c. a scraper connected to said frame rails lying between said frame rails and extending between the full width of said frame rails;

d. means for raising or lowering said scraper, said raising and lowering means further comprising a pair of dedicated hydraulic rams connected to said scraper at one of their ends and to said frame rails at their other ends and a pair of scraper arms pivotally connected at their upper ends to said frame rails and pivotally connected to said scraper at their lower ends;

e. means for raising or lowering said frame rails; and f. means for increasing or decreasing the weight loaded onto said ground scraper.

5. A ground scraper in accordance with claim 4 wherein said rear transverse brace and said transverse front frame member are connected to said pair of parallel frame rails adjacent to an upper portion of said pair of parallel frame rails such that said rear transverse brace and said transverse front frame member are not in contact with the ground during any stage of operation.

6. A ground scraper comprising:

a. a pair of parallel frame rails, said frame rails further comprising a left-hand side frame rail and a right-hand side frame rail;

b. a rear transverse brace connected to a rear end of each of said pair of parallel frame rails, said rear frame rail having a lower edge that is farther off of the ground than a lower edge of each said frame rail and a transverse front frame member connected at each end to a front end of each of said pair of parallel frame rails, said transverse front frame member having a lower edge that is farther off of the ground than a lower edge of each said frame rail;

c. a scraper connected to said frame rails lying between said frame rails and extending between the full width of said frame rails and means for raising and lowering said scraper, said raising and lowering means further comprising a double-acting scraper blade left-side hydraulic ram connected at one end to said scraper blade and at another end to said left-hand side frame rail and a double-acting scraper blade right-side hydraulic ram connected at one end to said scraper blade and at a second end to side right-hand side frame rail, whereby extending said double-acting scraper blade left-side hydraulic ram and said double-acting scraper blade right-side hydraulic rain drives said scraper blade deeper into the ground and retracting said double-acting scraper blade left-side hydraulic ram and said double-acting scraper blade right-side hydraulic ram draws said scraper blade to a shallower depth in the ground;

d. means for raising or lowering said scraper, said raising and lowering means further comprising a pair of dedicated hydraulic rams connected to said scraper at one of their ends and to said frame rails at their other ends and a pair of scraper arms pivotally connected at their upper ends to said frame rails and pivotally connected to said scraper at their lower ends;

e. means for raising or lowering said frame rails, and f. means for increasing or decreasing the weight loaded onto said ground scraper.

7. A ground scraper in accordance with claim 6 further comprising a tongue having a rear portion connected to said transverse front frame member and means for allowing said rear portion to float in response to changes in the terrain the ground scraper is pulled over raising or lowering a rear portion of said tongue relative to a front portion of said tongue, said tongue raising or lowering means further comprising a double-acting hydraulic ram mounted on a tongue hydraulic plate and having a piston pivotally connected to a vertical pivot arm that is connected to an actuates a horizontal tongue control arm connected to said tongue, whereby when said piston is extended, said distal end of said tongue is lowered and when said piston is retracted said distal end of said tongue is raised.

8. A ground scraper in accordance with claim 6 wherein said means for raising and lowering said frame rails into a ground-contacting use position further comprises a truck having a plurality of wheels, said truck mounted on said rear transverse brace and at least one hydraulic ram having one end connected to a top end of a right-angle bracket pivotally connected to a sleeve on an axle of said truck and at its other end to a right-angle bracket fixed to said rear transverse brace.

* * * * *